United States Patent [19]

Morrow, Jr. et al.

[11] 4,087,976
[45] May 9, 1978

[54] ELECTRIC POWER PLANT USING ELECTROLYTIC CELL-FUEL CELL COMBINATION

[75] Inventors: Walter E. Morrow, Jr., Weston; Michael S. S. Hsu, Lexington, both of Mass.

[73] Assignee: Massachusetts Institute of Technology, Cambridge, Mass.

[21] Appl. No.: 714,066

[22] Filed: Aug. 13, 1976

[51] Int. Cl.$^2$ .................. F01K 27/00; C25B 1/04
[52] U.S. Cl. ........................ 60/643; 60/721; 60/648; 429/17; 429/20; 204/DIG. 4
[58] Field of Search ............... 60/643, 645, 648, 649, 60/721; 429/17, 20; 204/DIG. 4

[56] References Cited
U.S. PATENT DOCUMENTS 3,615,850 10/1971 Chludzinski .................. 429/17
3,829,368 8/1974 Wesley .................. 204/DIG. 4

*Primary Examiner*—Allen M. Ostrager
*Attorney, Agent, or Firm*—Arthur A. Smith, Jr.; Martin M. Santa

[57] ABSTRACT

High-temperature (1200–1500K) electrolysis of water and recombination of the products in a medium-temperature (530K) fuel cell achieve a practical efficiency exceeding 50%. A solid electrolyte is chosen for the electrolytic cell and in combination with the Bacon fuel cell, which offers high efficiency and automatic replenishing of water vapor into the cycle realizes a high-efficiency electrochemical cycle. Both high-temperature, gas-cooled reactors and conventional combustion processes may be used as heat sources. Unconventional heat sources, such as concentrated solar energy, can also be used. A regenerative counterflow heat exchanger and a waste-heat power plant serve as energy-conserving devices. An important feature of this cycle is the flexibility of operation that can be achieved by adding hydrogen storage. Switching among power-generating, load-averaging, and hydrogen-generating modes can then be done by simple gas-flow valves.

5 Claims, 7 Drawing Figures

ELECTRIC POWER PLANT USING ELECTROLYTIC CELL-FUEL CELL COMBINATION

The Government has rights in this invention pursuant to Contract No. F19628-76-C-002 (AF) awarded by the Department of the Air Force.

INTRODUCTION

High-temperature (1200–1500K) electrolysis of water and recombination of the products in a medium-temperature (530K) fuel cell achieve a practical efficiency exceeding 50%. A solid electrolyte is chosen for the electrolytic cell and in combination with the Bacon fuel cell, which offers high efficiency and automatic replenishing of water vapor into the cycle realizes a high-efficiency electrochemical cycle.

SUMMARY OF THE INVENTION

Power cycles that convert heat to mechanical or electrical energy are limited by the Carnot efficiency $(T_h - T_c)/T_h$, where the hot and cold temperatures $T_h$ and $T_c$ of the cycle are measured in degrees absolute. In conventional power plants, $T_h$ is limited by the mechanical properties of the turbine-blade materials. In contrast the high-efficiency electrochemical power cycle operates at a higher $T_h$ because it contains no moving parts at high temperature.

Dissociation reactions such as $H_2O \rightarrow H_2 + \frac{1}{2} O_2$ or $CO_2 \rightarrow CO + \frac{1}{2} O_2$ can be accomplished by high-temperature electrolysis. The energy consumed by the dissociation reaction is partially heat and partially electrical energy. Recombination reactions $H_2 + \frac{1}{2} O_2 \rightarrow H_2O$ or $CO + \frac{1}{2} O_2 \rightarrow CO_2$ in a lower-temperature fuel cell release mostly electrical energy and some heat. If the electric power generated by the fuel cell exceeds the electric power consumed by the electrolytic cell, the dissociation recombination cycle converts thermal energy into a net electrical-energy output. Using the known thermodynamic quantities of the above reactions, the calculated efficiencies for such a cycle approach the ideal Carnot efficiencies.

"Oxygen-potential meters" utilize stabilized zirconia as a good $O^{2-}$-ion conductor at temperatures $T > 1000K$. When external electric power is applied, these meters can separate steam electrolytically into oxygen and hydrogen at high temperatures. Moreover, during the last decade, significant advances have been made in moderate-temperature fuel cells. The Bacon fuel cell, in particular, has served as the main power supply in the Apollo flights. The electrochemical power cycle that electrolyzes water at $T_h = 1200-1500K$ and recombines hydrogen and oxygen in an Apollo fuel cell at 530K is a specific example of the cycle used in this invention. The cycle uses published performance curves for the fuel cell and published data for $O^{2-}$-ion conductivity in a stabilized-zirconia ceramic membrane for the electrolytic cell. For $T_h = 1500K$, an encouraging practical efficiency of about 50 percent is obtained after inclusion of the auxiliary components, the prime heat source, counterflow heat exchangers, compressor, and thermal insulation. A practical efficiency of up to 65 percent is obtained by inclusion of a waste-heat power plant to convert to electricity the thermal energy discarded from the system at 530K. This is to be compared with a 40-percent efficiency for the best conventional power plants, or an estimated 50-percent efficiency for advanced cycles that use, for example, an MHD topping unit.

In addition to electric power, the electrochemical cycle also generates fuel. The fuel may be either stored for later use or collected. Switching from a power-generating mode to a fuel-generating mode or to an intermediate mode adjusted for load averaging can be accomplished by simple gas-flow valves.

The electrochemical power cycle described here should not be confused with the "regenerative-fuel-cell" plant, which is strictly a fuel-production and fuel-storage device that relies on photovoltaic cells to provide electric power for (room-temperature) electrolysis; nor should it be confused with the electrochemical cycle that uses a reformer to produce hydrogen from conventional fossil fuels.

A particular embodiment of the invention is discussed in more detail below with the help of the accompanying drawings, wherein FIG. 1 is a plot of enthalpy and Gibbs free energy of the reaction $H_2O(g) \rightarrow H_2 + \frac{1}{2} O_2$ at one atmospheric pressure as a function of temperature.

The Power Cycle

Figure 1:
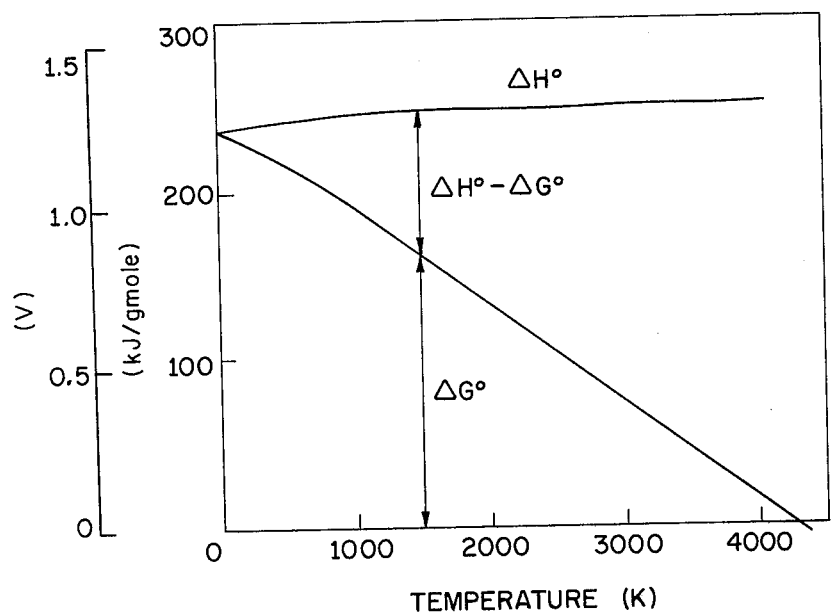

In FIG. 1, $\Delta H°$ is the enthalpy for the electrolytic reaction $H_2O \rightarrow H_2 + \frac{1}{2} O_2$. It has two components: The Gibbs free energy for the reaction $\Delta G°$, which must be supplied as electrical energy, and the entropy term $(\Delta H° - \Delta G°)$, which increases with T and is supplied as heat. The curves are similar for the fuel-cell reaction $H_2 + \frac{1}{2} O_2 \rightarrow H_2O$, except that $\Delta G°$ is available as electrical energy and $(\Delta H° - \Delta G°)$ is the heat dissipated. In the proposed power cycle, electrolysis occurs at a high temperature $T_h$ and electricity is generated by the fuel cell at a lower temperature $T_c$. Since $|\Delta G_c°| > [\Delta G_h°]$, the ideal efficiency of the cycle, defined as $$\eta_{th}° = \frac{|\Delta G_c°| - |\Delta G_h°|}{|\Delta H_h° - \Delta G_h°|} \quad (1)$$

is positive, and power generation is theoretically possible. However, the actual operating efficiency $\eta_{th}$ is reduced from ideal by the energy losses associated with the various components of the practical system. The estimated efficiency of about 50 percent for $T_h = 1500K$ and $T_c = 530K$ was obtained (see Table 1) after inclusion of cell over-voltages, heat-transfer losses, and auxiliary power consumption.

Other gases, such as $CO_2$, have thermodynamic properties that promise theoretically a more efficient power cycle. However, the electrolytic and fuel cells required for such a cycle are not readily available for $CO_2$.

PREFERRED EMBODIMENT OF THE INVENTION

Figure 2:
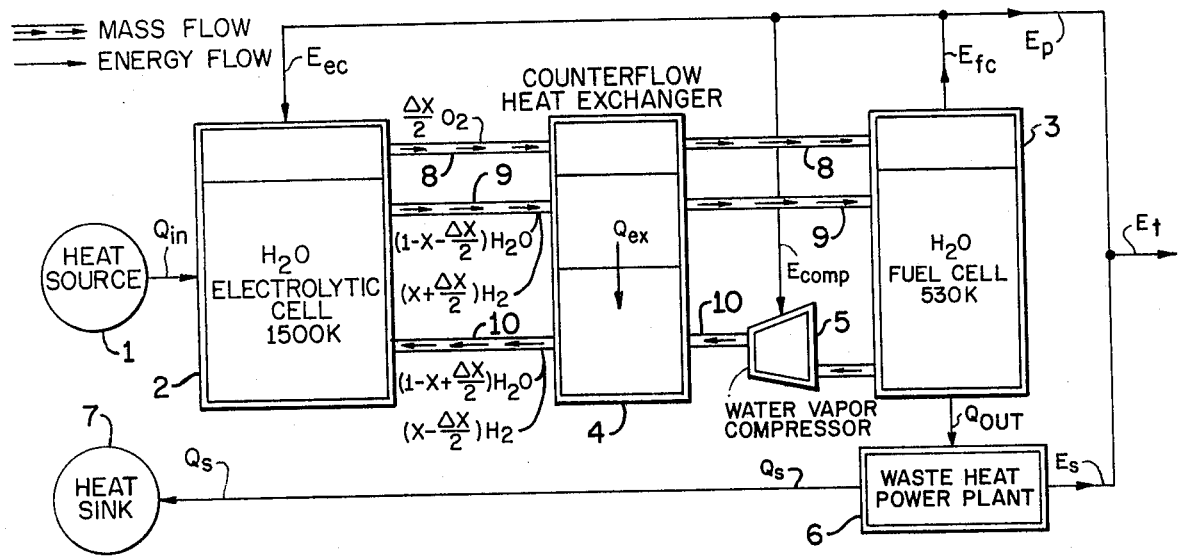
FIG. 2 is a schematic representation of the electrolytic cell-fuel cell electrochemical power cycle plant for electrical power generation.

An embodiment of the physical layout of a cycle is depicted schematically in FIG. 2. The components consist of a source 1 of high-temperature (T > $T_h$) heat, an electrolytic cell 2 operating as $T_h$ = 1200 — 1500 K, a Bacon fuel cell 3 operating at $T_c \sim$ 530 K, a counterflow heat exchanger 4 that conserves the sensible heat in the working medium, and a water-vapor compressor 5 to compensate for the drop in $p_{H_2O}$ due to friction loss in the power cycle (a pressure of 60 psia, or 4 atm absolute, is maintained at the fuel cell; and a pressure drop occurs along the heat exchanger, where a high gas velocity is required for a good heat transfer coefficient). Overall efficiency is increased by thermal insulation (not shown), and a waste-heat conventional power plant 6 (using steam or $NH_3$ as the working medium) that receives at a temperature $T < T_c$ = 530K, a waste-heat $q_1$ due to the inefficiency of the heat exchanger, a heat $q_2$ from friction losses in gas, and a heat $q_3$ from the fuel-cell ohmic and overvoltage losses. The total heat out, $Q_{out} = (q_1+q_2+q_3)$, is released at the fuel cell. Waste heat $q_5$ from plant 6 is dissipated in a conventional heat sink 7.

The working medium flows from the electrolytic cell to the Bacon cell in separate channels 8, 9 as $O_2$ and as $H_2O_{(g)}$ mixed with $H_2$, respectively. It flows from the Bacon cell back to the electrolytic cell in a single channel 10 as $H_2O_{(g)}$ mixed with a smaller fraction of $H_2$. The water dissociation occurs within the limits $(x - \frac{1}{2}\Delta x)$ and $(x + \frac{1}{2}\Delta x)$. The mean fraction $x$ and the range of water dissociation $\Delta x$ is chosen to optimize the total cycle efficiency. The efficiency of the electrolytic cell is higher the smaller the fraction of dissociation, but the efficiency of the fuel cell is higher the greater the fraction of dissociation.

THE PRIMARY HEAT SOURCE

Available solid-electrolyte materials for the electrolytic cell (stabilized zirconia, ceria, and hafnia) have sufficient $O^{2-}$-ion conductivity only above about 1000K. The $O^{2-}$-ion mobilities are thermally activated, and at lower temperatures the $I^2R$ losses in the membrane become excessive.

Therefore, the heat sources supplying thermal energy to the electrolytic cells must operate at high temperatures, preferably at T > 1200 K. The two heat sources discussed here are high-temperature gas-cooled reactors and fossil-fuel combustion furnaces. The existing high-temperature reactors have high enough outlet temperatures to operate the electrochemical power plant disclosed herein. Concentrated solar energy is another possibility.

The efficiency of a nuclear reactor as a heat source 1 is determined mainly by the losses associated with fuel processing and recycling. In the following cycle analysis, fuel losses are assumed to be 1.5 percent, giving a reactor efficiency $\eta_{react}$ = 0.985. The energy-flow diagram for a reactor-electrochemical power plant is shown in FIG. 2.

If combustion gas produced in furnace 14 is used as the heat source 1, only the enthalpy of the gas released between the combustion temperature (about 2000 K) and $T_h$ is utilized by the electrochemical plant. A bottoming plant, would utilize the thermal energy left in the combustion gas. This energy is the difference in the gas enthalpy between $T_h$ and the stack-gas temperature (380 K). In the combustion-electrochemical power plant, the bottoming steam plant 11 and the waste-heat plant 6 can be arranged to operate on a single shaft 12 along with the water-vapor compressor 5 and turbogenerator 13, as indicated schematically in FIG. 3.

Figure 3:
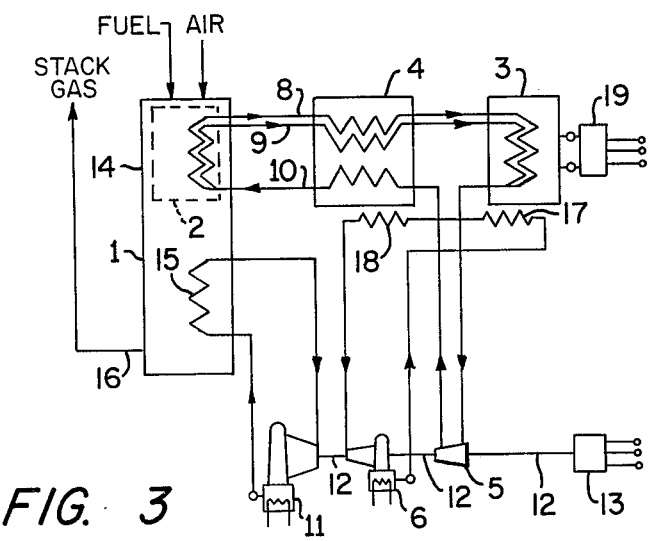
FIG. 3 shows a schematic of a combusion-electrochemical plant for electrical power generation.

The electrolytic cell 2 is at the highest temperature region of furnace 14 whereas the steam generator 15 is at a lower temperature nearer the furnace stock 16. The fuel cell 3 and the counterflow heat exchanger 4 are shown with heat exchangers 17,18, respectively, to provide steam to the waste heat plant 6. An inverter 19 is shown in FIG. 3 which produces three-phase alternating voltage from the d.c. voltage output of fuel cell 3.

THE ELECTROLYTIC CELL

The prior art oxygen-potential meter consists of a tube of stabilized zirconia with porous catalytic conductors at the inner and outer surfaces and a furnace to maintain the tube at a temperature of 1000 K. In use, a gas with unknown oxygen pressure $P_x$ flows over one surface while oxygen (or air) with oxygen pressure $p_1$ flows over the other. The emf developed between the electrodes is $$\epsilon = (RT/nF) \ln (p_x/p_1)$$

where $R$ is the universal gas constant, $F$ is the Faraday constant, and $n = 4$ is the number of electrons transported per $O_2$ molecule across the electrolyte.

Such a cell can also be used as an "oxygen pump". An external voltage is placed across the electrolyte, oxygen flows from one side of the oxide to the other until the ratio of partial pressures satisfies Eq.(2). Moreover, such a pump can remove oxygen from steam to produce hydrogen. The simple geometric structure shown in FIG. 4 illustrates an embodiment of a hydrogen generator.

Figure 4:
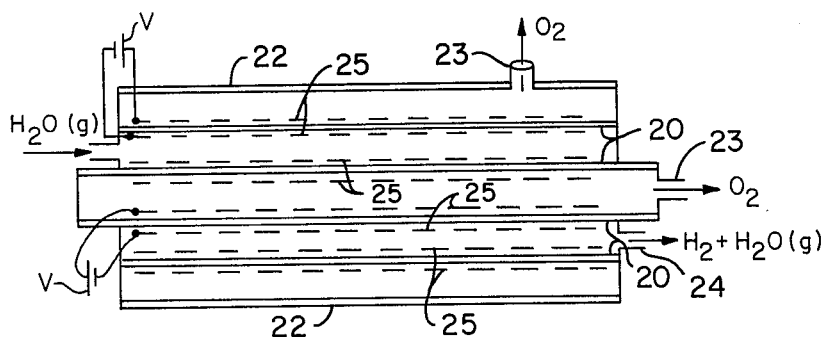
FIG. 4 is a cross-sectional view of an electrolytic cell.

The electrolytic cell of FIG. 4 has a highly refractory solid electrolyte 20 that has a high $O^{2-}$-ion conductivity at the operating temperature $T_h$. In this cell, $H_2O(g) + 2e \rightarrow H_2(g) + O^{2-}(s)$ at one surface of the electrolyte; $O^{2-}(s) \rightarrow \frac{1}{2} O_2(g) + 2e$ at the other surface. Steam enters port 21 and flows between two concentric tubes of zirconia 20; the $O_2$ is confined by enclosure 22 and leaves at ports 23, while $H_2O(g)$ and $H_2$ leave at port 24. The zirconia is coated with nickel or platinum as thick as possible to minimize electrical losses while allowing $H_2O$ and $O_2$ to pass through the coatings 25. A voltage V across the electrolyte 20 drives $O^{2-}$ ions in the membrane to complete the electric circuit. The voltage V required for electrolysis depends upon the partial pressure of the gas components. Moreover, the voltage increases with current because of the ohmic losses in the electrodes and electrolyte. There are also chemical and concentration overvoltages associated with the activation energies for chemical reactions at the catalytic electrodes and for diffusion of the reactants. High-temperature electrolysis utilizing stabilized zirconia has been demonstrated.

The reference voltage $V_o$ corresponds to that required for electrolysis at temperature T in the presence of 1 atm of each of the gaseous constituents: $H_2O(g)$, $H_2$ and $O_2$. The dependence of the voltage V on the partial pressures of the gases may be expressed in terms of $V_o$ as $$V - V_o = (RT/nF) \ln (p_{H_2} p_{O_2}^{\frac{1}{2}}/p_{H_2O})$$

where $n = 2$ is the number of electrons transported through the electrical circuit per dissociated molecule and F is Faraday's constant. In order to keep $V - V_o$ small, or even negative, it is necessary to keep small the fraction $p_{H_2}p_{O_2}^{\frac{1}{2}}/p_{H_2O}$. Without an oxygen compressor, $p_{O_2}$ is fixed, and we choose a small mean ratio $p_{H_2}/p_{H_2O} = x/(1-x)$. In the analysis below (see Table 1) we choose $x = 0.125$ and $p_{O_2} = 4.25$ atm for the reference cycle.

High-temperature electrolysis has two fundamental advantages over conventional electrolysis: (1) Whereas electrolysis of water at room temperature requires 1.23 V plus moderate overvoltages, operation at high temperatures reduces the voltage $\Delta G°/nF$ required as shown in FIG. 1. At $T_h = 1500$ K, FIG. 1 gives a reference voltage $V = 0.853$ V. Control of the fraction $p_{H_2}/(p_{H_2O}+p_{H_2})$ at the output of the electrolytic cell can reduce this voltage by as much as 0.1V. (2) High temperature promotes equilibrium, which reduces the chemical and concentration overvoltages and removes the requirements for expensive scarce-material catalytic electrodes. At $T_h = 1500$ K, the overvoltages are negligible, and the respective hydrogen and oxygen electrodes may for example, be nickel and $Sn_{1-x}Sb_xO_2$.

Figure 5:
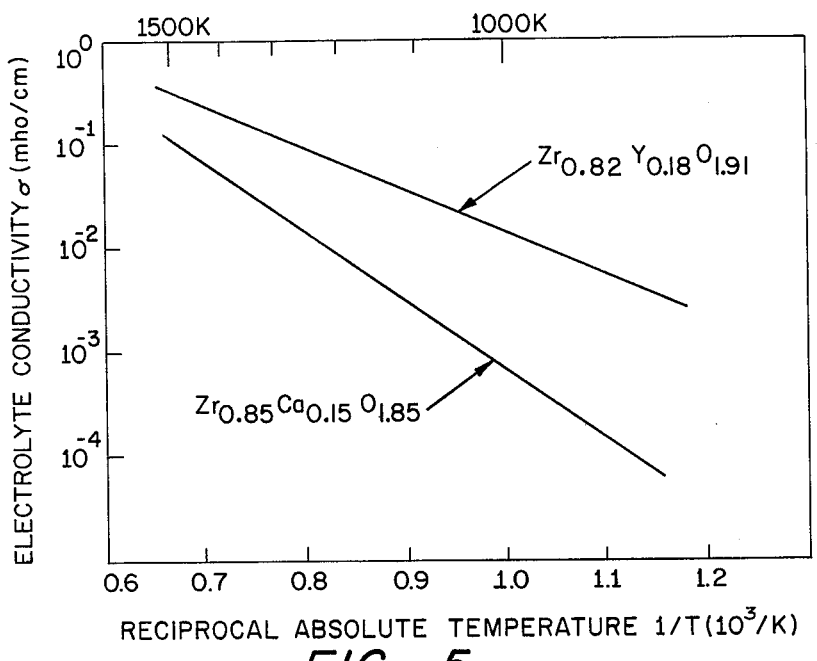
FIG. 5 is a plot of the electrical conductivity of solid electrolytes.

Ohmic losses occure predominantly in the electrolyte, and the temperature $T_h$ must be high enough for the $O^{2-}$-ion conductivity in the solid electrolyte to be comparable to ionic conductivity in a liquid electrolyte. FIG. 5 shows curves of electrical conductivity vs reciprocal temperature for typical electrolytes of stabilized zirconia. Electronic leakage currents are negligible in these compounds: the curves represent the $O^{2-}$-ion conductivities. Above 1300 K, the resistivity of Ca-stabilized zirconia is small enough for efficient operation of the electrolytic cell. At lower temperatures, the more expensive Y-stabilized zirconia is preferred. With a Ca-stabilized zirconia membrane 0.2 mm thick having a plate or tube length of 0.5m and electrodes of 0.2mm-thick Ni and 1 mm-thick $Sn_{0.95}Sb_{0.05}O_2$-Ni cermets, we obtain a total ohmic overpotential of 0.05 V at a current density of 200 A/m² and a $T_h = 1500$ K.

Corrosion is not a problem, even at these high temperatures, since both the stabilized zirconia and the oxide catalytic electrode are extremely refractory and the metal electrode operates in a reducing atmosphere. Thermally induced stresses at the electrode-electrolyte interface is minimized by using materials with matching coefficients of thermal expansion and by using thin electrode films.

The Fuel Cell

The Bacon (Apollo) fuel cell, developed by Pratt & Whitney, is the existing fuel cell having the best performance in this invention. This cell is described in: W. E. Simon, "Transient Thermodynamic Analysis of a Fuel-Cell System", NASA TN D-4601, June 1968; L. G. Austin, "Fuel Cells: A Review of Government Sponsored Research, 1950-1964", NASA SP-120 (1967); W. Vielstich, "Fuel Cells", (Wiley-Interscience, 1970) Chap. IV. This cell is designed to operate at elevated temperatures (400-530 K). At these temperatures and with nickel electrodes, the chemical and concentration overvoltages are minimal (and neglected in comparison with the ohmic losses in the cycle analysis below). The electrolyte is 73 KOH:27 $H_2O$ by weight. At 530 K the cell operates at a pressure of about 4 atm absolute.

Figure 6:
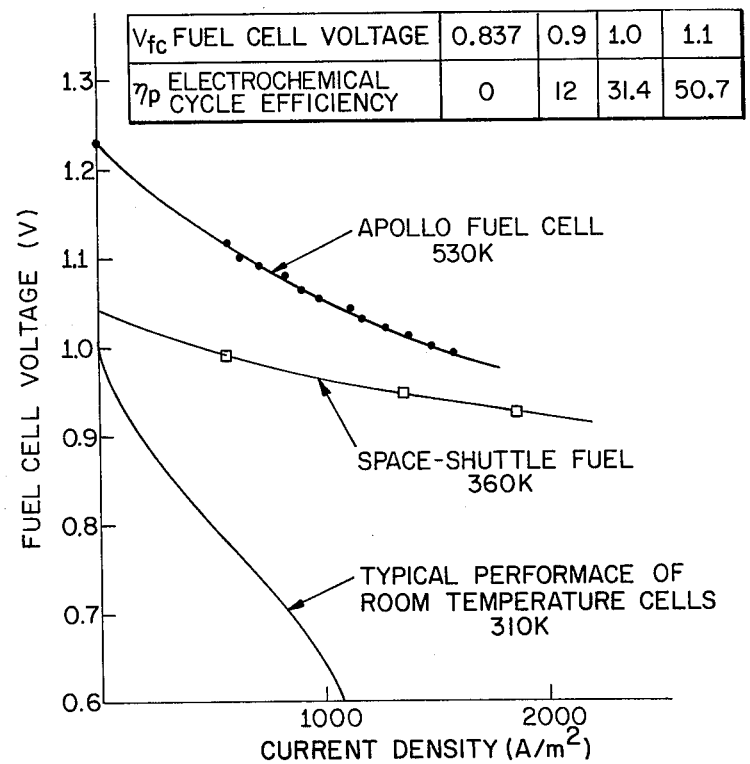
FIG. 6 shows fuel cell performance curves.

The performance curves of a single Pratt & Whitney Apollo cell, converted from data on a power unit consisting of 31 cells operating with pure $O_2$ and $H_2$, are given in FIG. 6. At 530 K and 270 A/m², the output of the fuel cell is $V_{pw} = 1.16$ V, where the subscript pw refers to the Pratt & Whitney cell.

In the electrochemical cycle of this invention, the fuel cell is operated on a mixture of $H_2O$ and $H_2$ instead of pure $H_2$. Since $H_2O$ is given off at the hydrogen electrode, the presence of water in the hydrogen does not poison the reaction. However, the voltage output becomes:

$$V_{fc} - V_{pw} = \frac{RT_c}{nF} \ln\left( \frac{p_{H_2}}{p_{H_2,pw}} \cdot \frac{p_{H_2O,pw}}{p_{H_2O}} \right)$$

where the subscript fc refers to the fuel cell of FIG. 2. The decreased concentration of $H_2$ in the electrochemical cycle and the increased $H_2O$ content reduce $(V_{fc} - V_{pw})$. At $p_{H_2}/(p_{H_2O} + p_{H_2}) = 0.125$, we obtain for $T_c = 530$ K a $(V_{fc} - V_{pw}) = -0.06$, and hence $V_{fc} = 1.10$.

Production of $H_2O$ at the hydrogen electrode simplifies gas handling in the cycle. The water molecules depleted from the working medium by electrolytic dissociation are automatically replenished at the hydrogen electrode of the fuel cell.

Auxiliary Components

The high-temperature heat source must supply not only the heat required for electrolysis at $T_h$, but also the heat lost through the thermal insulation and the heat required to raise the temperature of the working medium from $T_h - \Delta T_{ex}$ to $T_h$, where $\Delta T_{ex}$ is the temperature difference across which heat is transferred in the heat exchanger. In the cycle analysis, a $\Delta T_{ex} = 30°$ C is chosen. The wasteheat power plant recieves a quantity of heat $q_1 + q_2 + q_3$. The heat $q_1$ is the enthalpy difference of a gram-mole of working medium at temperatures $T_c$ and $(T_c + \Delta T_{comp} + \Delta T_{ex})$, where $\Delta T_{comp}$ is the temperature increase due to compression at the water-vapor compressor. The heat $q_2$ is the heat dissipated into a gram mole of the gas due to friction. The heat $q_3$ is primarily due to ohmic losses in the fuel-cell electrolyte and electrodes; other overvoltage losses are neglected in the analysis.

The energy required to operate the compressor 5 is $$E_{comp} = \frac{RT}{\bar{n}-1}\left[\left(\frac{p_2}{p_1}\right)^{\bar{n}-1} - 1\right]/\eta_m$$

where the subscripts 1 and 2 refer to conditions at the inlet and exit of the compressor, n is the polytropic coefficient and $\eta_m \approx 0.90$ is the mechanical efficiency of the compressor.

The conversion of dc to ac can be carried out in static inverters or rotary inverters 19. The former type, utilizing thyristors or mercury-arc tubes, currently appear in low-cost units operated at close to 80% efficiency. The latter type, consisting of synchronous motors in the circuits, can achieve a highest efficiency around 97%. It can be expected that, under heavy stress on conversion efficiency, the static inverts can be developed into high efficiency units while maintaining a low cost. The inefficiency of the inverters is assumed small and ignored in the analysis presented in this application.

High-Temperature Components and Thermal Insulation

The electrolytic cell and heat exchanger operate in a temperature range that makes high demands on material strengths and chemical stabilities. However, no fundamental limit to engineering design exists for an operating $T_h$ in the range 1200–1500 K. This conclusion is due to the following features of the system:

a low operating pressure (5atm), only static loading at the high-temperature components, mildly corrosive media ($O_2$, $H_2$, and $H_2O$).

Commercially available, high-temperature metals such as Hastelloy alloy X, Haynes 188, Inconel-X 750 and Inconel 617 all have adequate strength, corrosion resistance, and high-temperature-creep properties at 1400 K. Moreover, the refractory oxides provide service temperatures that are higher than those needed for operation of the electrochemical power plant.

The electrolytic cell and high-temperature portion of the heat exchanger can be integrated into a single package having the form of either stacked plates or extended coaxial-tube bundles. The plates or tube walls are made of a refractory, electrically insulating oxide such as alumina. The thermal conductivity of such an oxide is sufficient to make quite acceptable the temperature drop across the thickness of a plate or tube wall. Moreover, the relatively low thermal conductivity reduces axial heat leakage, a factor that must be minimized in the design of an efficient counterflow heat exchanger.

The most effective insulation of the high-temperature package consists of multilayer radiation shields in a vacuum. Molybdenum-zirconia cloth is a commercially available material that essentially provides a multilayer-vacuum insulation. In insulating a source at 1500 K against room temperature, it is capable of limiting the effective thermal conductivity to $1.5 \times 10^{-3}$ BTU/hr ft ° F. Effective thermal insulation for an operating temperature $T_h = 1500$ K poses a nontrivial problem. However, an insulation efficiency of 97.5 percent is realistic.

Cycle Analysis

Table 1 summarizes the cycle analysis for two heat-source temperatures: 1500 and 1200 K.

We choose for the present analysis $T_c = 530$ K and a fuel-cell pressure of 4 atm to conform to the operating conditions of the Pratt & Whitney Bacon cell. If $2\Delta p$ is the additional pressure provided by the water-vapor compressor, the water-vapor pressure at the electrolytic cell is $(4 + \Delta p)$ atm, since the electrolytic cell is located halfway down the heat exchanger along which the pressure drops $2\Delta p$. A $\Delta p = 0.25$ atm is chosen.

As shown in FIG. 2, we assume that a fraction $\Delta x$ of the working medium is electrolyzed. In order to avoid operating close to full recombination at the fuel-cell exit, a residual $H_2$ concentration $(x - \frac{1}{2}\Delta x)$ leaves the fuel cell. Under this condition, the fuel cell receives at the $H_2$ electrode a fraction of $H_2$ equal to $(x + \frac{1}{2}\Delta x)$. A $\Delta x = 0.25$ and the condition $0 < (x - \frac{1}{2}\Delta x) << 0.25$ were chosen for the analysis.

TABLE I

Cycle Analyses of Electrochemical Plants

| | | Reference Cycle | |
|---|---|---|---|
| ELECTROLYTIC CELL | | | |
| Temperature | $T_h = T_{ec}(K)$ | 1500 | 1200 |
| Pressure | $P_{ec}(atm)$ | 4.25 | 4.25 |
| $(^PH_2/(^PH_2O + ^PH_2))_{ec}$ | $x_{ec}$ | 0.125 | 0.125 |
| Standard input voltage | $V_{eco}$(volts) | 0.853 | 0.937 |
| Pressure effect | $\Delta V_{ec}$(volts) | −0.08 | −0.064 |
| Electric overvoltage | $\Delta V_{ee}$(volts) | 0.05 | 0.05 |
| Required voltage | $V_{ec}$(volts) | 0.823 | 0.923 |
| FUEL CELL | | | |
| Temperature | $T_c = T_{fc}(K)$ | 530 | 530 |
| Pressure | $P_{fc}(atm)$ | 4.0 | 4.0 |
| $(^PH_2/(^PH_2O + ^PH_2))_{fc}$ | $x_{fc}$ | 0.125 | 0.125 |
| Voltage of P&W Apollo Cell | $V_{pw}$(volts) | 1.16 | 1.16 |
| Pressure Effect | $\Delta V_{fc}$(volts) | −0.06 | −0.06 |
| Output voltage | $V_{fc}$(volts) | 1.10 | 1.10 |
| COMPRESSOR | | | |
| Press. Difference | $p_2-p_1$(atm) | 0.5 | 0.5 |
| Polytropic coeff. | n | 1.10 | 1.10 |
| Mechanical eff. | $\eta_m$ | 0.9 | 0.9 |
| HEAT EXCHANGER | | | |
| Temp. Difference | $\Delta T_{ex}(K)$ | 30.0 | 30.0 |
| WASTE HEAT PLANT | | | |
| Temp. of heat sink | $T_s(K)$ | 300. | 300. |
| Waste heat plant eff. | $\eta_s$ | 0.3 | 0.3 |
| CYCLE PARAMETERS | | | |
| Range of Electrolytic dissociation | $\Delta x$ | 0.25 | 0.25 |
| Insulation eff. | $\eta_i$ | 0.975 | 0.975 |
| THERMAL ENERGY (gmole $H_2O$) | | | |
| Standard heat required | $Q_{eco}$(kJ) | 21.48 | 17.19 |
| Pressure effect | $\Delta Q_{ec}$(kJ) | 3.87 | 3.1 |
| Overvoltage effect | $\Delta Q_{ee}$(kJ) | −2.42 | −2.42 |
| Heat for $\Delta T_{ex}$ | $\Delta Q_{ex}$(kJ) | 1.4 | 1.4 |
| $\Sigma Q = Q_{eco} + \Delta Q_{ec} + \Delta Q_{ee} + \Delta Q_{ex}$ | | 24.33 | 19.27 |
| $\Sigma Q/\eta_i Q_{in}$(kJ) | | 24.95 | 19.76 |
| ELECTRIC ENERGY | | | |
| Elec. energy for electrolysis | $E_{ec}$(kJ) | −39.84 | −44.7 |
| Elec. energy output by fuel cell | $E_{fc}$(kJ) | 53.26 | 53.26 |
| Energy for $H_2O$ compressor | $E_{comp}$(kJ) | −0.58 | −0.58 |
| Electric output by primary electrochemical plant | $E_p$(kJ) | 12.84 | 7.98 |
| Energy output by secondary waste heat plant | $E_2$(kJ) | 3.63 | 3.53 |
| Total output | $E_t$(kJ) | 16.47 | 11.51 |
| EFFICIENCIES | | | |
| Efficiency of electrochemical plant | $\eta_p$ | 51.5 | 40.38 |
| Total efficiency | $\eta_t$ | 66.0 | 58.3 |

The voltages $V_{ec}$ and $V_{fc}$ are the input of the electrolytic cell and the output of the fuel cell. They are converted to the energies $E_{ec}$ and $E_{fc}$ per gram mole of working medium via the relation $E = nFV\Delta x$, where $nF = 192.9$ kJ/gmole. V.

The total heat input to the electrolytic cell, including heat loss through the thermal insulation and the inefficiency of the counterflow heat exchanger ($\Delta T_{ex} = 30°$ C), is tabulated under $Q_{in}$. The heat dumped into the wasteheat power plant $Q_{out}$, including the surplus heat in the heat exchanger, the heat due to friction of circulating gas, and heat generated in the fuel cell can be expressed as $$Q_{out} = (q_1 + q_2 + q_3) \approx Q_{in} - E_p$$

where the energy of the primary cycle is $$E_p = E_{ec} + E_{fc} + E_{comp}$$

The energy delivered by a secondary cycle of thermal efficiency $\eta_s$ is $$E_s = \eta_s Q_{out}$$

The total efficiency of the cycle is thus $$\eta_t = \frac{E_t}{Q_{in}} = \frac{(E_{fc} + E_{ec}) + (E_s + E_{comp})}{Q_{in}}.$$

We choose as a reference cycle the power cycle having a 1500 K source and Ca-stabilized zirconia for the electrolyte of the electrolytic cell. It has a calculated efficiency of 66%. The cycle with a 1200 K source also offers a respectable efficiency of 58,3%. However, the Y-stabilized zirconia assumed for its electrolytic cell is more expensive.

Calculation of plant efficiencies must include the heat source in the analysis. Based on the evaluation of the reference cycle, a reactor-electrochemical power plant would have an efficiency $$\eta_{react-ec} = \eta_t \cdot \eta_{react} = 0.65$$

for $\eta_{react} = 0.985$ and $\eta_t = 0.66$.

The efficiency of a combustion-electrochemical power plant depends on the fraction $f_p$ of the available thermal energy that is consumed by the primary electrochemical plant:

$$\eta_{comb-ec} = f_p \eta_t + (1 - f_p)\eta_b$$

where $\eta_b$ is the efficiency of the bottoming steam plant. Although the operating-temperature coverage is larger for the steam cycle, the combustion gas is more dissociated, and hence has a higher specific heat, in the high-temperature ranges. Therefore, it is reasonable to assume an $f_p = 0.5$, which gives $$\eta_{comb-ec} = 0.52 \text{ for } \eta_t = 0.66, \eta_6 = 0.38$$

Storage/Generating Operation

Figure 7:
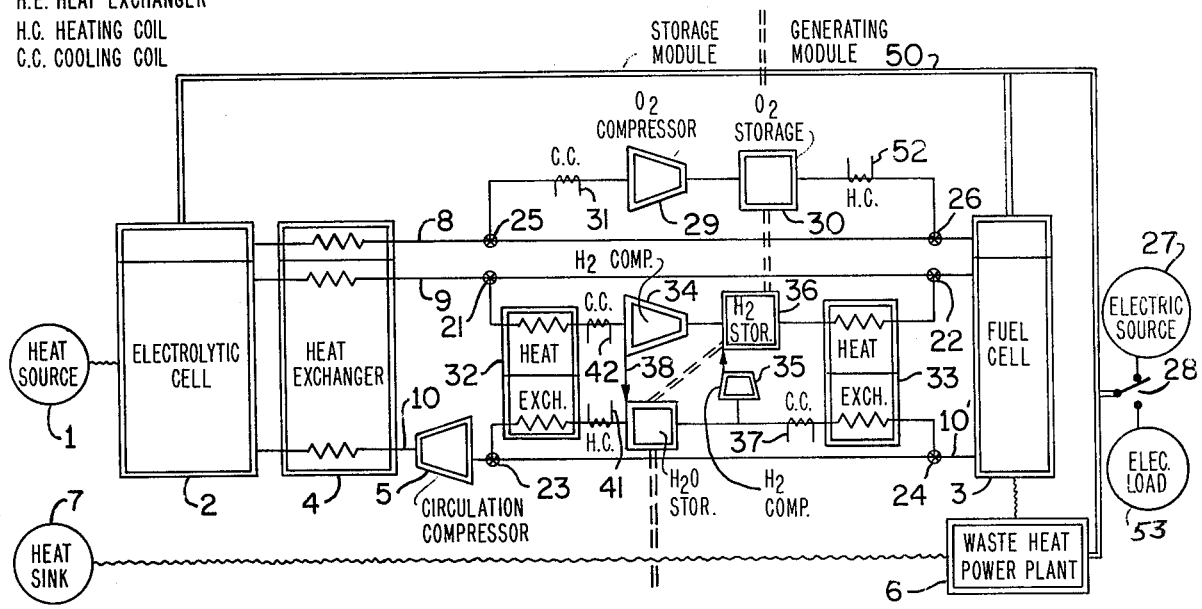
FIG. 7 is a schematic of an $H_2O$ electrochemical cycle for electrical power generation and gaseous $H_2$ storage.

Addition of hydrogen storage between the counterflow heat exchanger and the fuel cell, as shown in FIG. 7, permits switching from the high-efficiency power-cycle operation to a storage generating operation, and in this latter operation between a power-generating and a power-storage mode, by simple gas-flow switching at the valve junctions 21–26.

Storage mode.

Flows to and from the fuel cell are blocked by valves 22, 24, and 26. The electrolytic cell 2 is connected to an external d.c. electrical power source 27 through switch 28. The oxygen flow in line 8 from the heat exchanger 4 is directed by valve 25 to $O_2$-compressor 29 and stored in pressurized storage tank 30. A cooling coil 31 cools the $O_2$ before compression. The $H_2$ and $H_2O$ gasses in lines 9, 10', are directed by valves 21, 24 into heat exchangers, 32, 33 respectively, where they are cooled to condense out the $H_2O$ before the gaseous hydrogen is compressed by compressors 34,35 for storage in tank 36. Cooling coils 42, 37 cool the $H_2$ before compression. The condensed $H_2O$ is drained off in lines 38,39 to the water reservoir 40 for the electrolytic cell. In this mode, the cycled water must be evaporated, at the expense of extra heat, and preheated in heat exchangers 32, 4, being heated to temperature by the heat source 1 and entering the electrolytic cell 2. Heating coil 41 heats the water before it enters the heat exchangers.

Generating Mode

In operating the generating module 50, electric-power generation can be initiated by delivering oxygen and hydrogen to the fuel cell from the pressurized tanks, 30, 36, respectively, through valves 26, 22, respectively. Hydrogen from tank 36 is preheated in heat exchanger 33 by the fuel-cell $H_2 + H_2O$ exhaust in line 51, water condensed from the exhaust going to the reservoir 40 and residual hydrogen returning to storage tank 34 via compressor 35. Oxygen from storage tank 30 is heated by heating coil 52 before going into the fuel cell. Both the fuel cell and waste-heat power plant 6 generate electric power.

Three storage schemes for the $H_2$ are possible: gaseous, liquid or solid hydride. Comparison of the three storage schemes shows that both gaseous and hydride storage are practical, liquid-hydrogen storage is less practical. At room temperature, the alloy FeTi absorbs dehydrated hydrogen gas to form a hydride, FeTiH, thus storing hydrogen in a compact convenient form. At about 200° F, the hydrogen is released from the hydride. A plant using hydride storage would be modified slightly from FIG. 7 in a manner obvious to those skilled in the art.

Hydrogen Generation

The plant of FIG. 7 can also be used to generate hydrogen from the heat supplied at $T_h$. This is equivalent to the thermal decomposition of water by catalytic action. In this operation, the output of the fuel cell is matched to the electric-power consumption of the electrolytic cell, so no electric power from the external world is consumed. The surplus $H_2$ is stored for delivery either in pressurized tanks or in a hydride. The thermal energy required to generate 1 gmole of $H_2$ from liquid water is $Q_{in}^g = 454$ kJ for a gas at 150 atm and $Q_{in}^s = 422.5$ kJ for the FeTi hydride. Based on the high-heat value of $H_2$, the chemical-storage efficiency is 62% for gaseous storage and 67% for the hydrides.

Conclusion

An electrochemical plant operating on the dissociation and recombination of $H_2O$ at different temperatures achieves a practical efficiency exceeding 50 percent. Furthermore, such a plant is capable of converting thermal energy to (1) electric power, (2) fuel, or (3) a combination of the two that can be optimized for a variable power demand and/or a variable heat input. Simple gasflow valves for switching among these modes allow complete flexibility of operation.

Although the invention has been described in detail for a particular working medium, i.e., $H_2O$, it is apparent to those skilled in the art that other media such as $CO_2$, which has the same thermodynamic tendency in dissociation as $H_2O$, can be used as the working medium in the electrochemical power cycle $CO_2 \rightleftarrows CO + \frac{1}{2} O_2$.

While the particular embodiment of the invention specifically discussed above seems preferable at the present time, modification thereto may occur to those skilled in the art without departing from the spirit and scope of the invention. Hence, the invention is not to be construed as limited to the particular embodiment shown and described herein, except as defined by the appended claims.

What is claimed is:

1. An electrochemical energy system comprising
an electrolytic cell containing a dissociative working medium,
a source of thermal energy providing energy to said electrolytic cell,
a fuel cell providing electrical energy to said electrolytic cell,
said electrolytic cell being responsive to said thermal energy and said electrical energy to substantially dissociate and physically separate said working medium into its molecular components,
a counterflow heat exchanger,
said molecular components flowing from said electrolytic cell to said fuel cell through said heat exchanger and said working medium flowing from said fuel cell to said electrolytic cell through said heat exchanger wherein heat energy is transferred from the high temperature molecular component to the low temperature working medium to cool said molecular components to the temperature required by said fuel cell and to raise the temperature of the working medium to the temperature required by said electrolytic cell, and
a compressor for compressing said working medium as it passes from said fuel cell to said electrolytic cell.

2. The system of claim 1 wherein
said working medium is $H_2O$, and
said molecular components are $H_2$ and $O_2$.

3. The system of claim 2 where
the temperature of the steam is at least 1200° K in the electrolytic cell and less than or equal to 530° K.

4. The system of claim 1 wherein
said working medium is $CO_2$, and
said molecular components are CO and $\frac{1}{2} O_2$.

5. The system of claim 1 comprising in addition
a waste heat power plant thermally connected to said system to utilize the waste heat from said system.

* * * * *